United States Patent
Zdroik

(10) Patent No.: US 7,114,490 B2
(45) Date of Patent: Oct. 3, 2006

(54) MULTIPLE PUMP FUEL DELIVERY SYSTEM

(75) Inventor: Michael J. Zdroik, Metamora, MI (US)

(73) Assignee: Millennium Industries, Auburn Hills, MI (US)

( * ) Notice: Subject to any disclaimer, the term of this patent is extended or adjusted under 35 U.S.C. 154(b) by 246 days.

(21) Appl. No.: 10/949,909

(22) Filed: Sep. 24, 2004

(65) Prior Publication Data

US 2006/0065246 A1    Mar. 30, 2006

(51) Int. Cl.
F02M 37/04 (2006.01)
F02D 17/00 (2006.01)
(52) U.S. Cl. ............... 123/497; 123/509; 123/198 D
(58) Field of Classification Search ............... 123/497, 123/509, 198 D, 198 DB
See application file for complete search history.

(56) References Cited

U.S. PATENT DOCUMENTS

| | | | |
|---|---|---|---|
| 2,851,857 A | 9/1958 | Jones | |
| 4,073,140 A | 2/1978 | Lang et al. | 60/405 |
| 4,291,532 A | 9/1981 | Robinson | 60/223 |
| 4,591,317 A | 5/1986 | Markunas | 417/288 |
| 4,846,118 A | 7/1989 | Slattery et al. | 123/73 |
| 4,971,017 A | 11/1990 | Beakley et al. | 123/510 |
| 5,050,567 A | 9/1991 | Suzuki | 123/514 |
| 5,078,167 A | 1/1992 | Brandt et al. | |
| 5,190,444 A | 3/1993 | Grinsteiner et al. | 417/199.1 |
| 5,195,494 A | 3/1993 | Tuckey | |
| 5,245,819 A | 9/1993 | Kast | 60/39.06 |
| 5,433,241 A | 7/1995 | Robinson | |
| 5,842,837 A | 12/1998 | Nakayoshi et al. | 417/286 |
| 5,855,197 A * | 1/1999 | Kato | 123/516 |
| 6,032,639 A | 3/2000 | Goto et al. | 123/295 |
| 6,129,074 A | 10/2000 | Frank | |
| 6,230,691 B1 | 5/2001 | Coha et al. | 123/514 |
| 6,276,342 B1 | 8/2001 | Sinz et al. | 123/514 |
| 6,341,947 B1 | 1/2002 | Otomo | 417/286 |
| 6,371,153 B1 * | 4/2002 | Fischerkeller et al. | 137/265 |
| 6,408,828 B1 | 6/2002 | Wheeler | 123/479 |
| 6,536,415 B1 * | 3/2003 | Joos et al. | 123/497 |
| 6,708,673 B1 * | 3/2004 | Herzog et al. | 123/509 |
| 6,810,908 B1 * | 11/2004 | Eck et al. | 137/565.22 |
| 6,834,673 B1 | 12/2004 | Robinson | |
| 6,971,373 B1 * | 12/2005 | Mudway et al. | 123/497 |
| 7,069,913 B1 * | 7/2006 | Crary | 123/509 |
| 2005/0147856 A1* | 7/2005 | Albrodt et al. | 429/17 |
| 2005/0155582 A1* | 7/2005 | Schelhas et al. | 123/497 |

* cited by examiner

*Primary Examiner*—Thomas Moulis
(74) *Attorney, Agent, or Firm*—Dykema Gossett PLLC

(57) ABSTRACT

A multiple pump fuel delivery system is provided, which in one preferred embodiment includes a tank. Mounted within the tank are multiple fuel pumps. The fuel pumps have intakes connected to filters. One pump may be connected to a fuel only passing filter, and another pump may be connected with a fuel-water mixture passing filter. Fuel from the outlets of the pumps is delivered past non-return check valves through a manifold. The manifold is connected with a pressure regulator valve, which is fluidly communicative with the engine of the vehicle. A relief outlet is also provided to return excess fuel.

31 Claims, 5 Drawing Sheets

MULTIPLE PUMP FUEL DELIVERY SYSTEM

FIELD OF THE INVENTION

The field of the present invention is fuel delivery systems for internal combustion engines and more particularly, fuel delivery systems for internal combustion engines utilized in marine vehicle applications.

BACKGROUND OF THE INVENTION

Vehicles, by definition, are not stationary. Therefore, the fuel delivery system for an internal combustion engine of a vehicle must operate regardless of the angular orientation of the vehicle. The fuel delivery system must also operate regardless of the acceleration forces on the fuel within the fuel tank. This is particularly true of marine-type vehicles. Additionally, the fuel delivery system of a vehicle must be highly reliable. Accordingly, many marine-type vehicles rely on redundant systems.

A problem that can be particularly prevalent in marine vehicle applications is contamination of the fuel by water. The water contamination may be a result of poor underground storage facilities by the fuel supplier, fuel tank condensation during vehicle operation, or ingestion during refueling of the vehicle.

SUMMARY OF THE INVENTION

To improve upon fuel delivery systems, a revelation of the present invention is brought forth. In one embodiment of the present invention, a multiple pump fuel delivery system is provided. The fuel delivery system includes a tank. Mounted within the tank are multiple fuel pumps. A pressure differential valve provided by a low pressure check valve may allow entry of fuel into the reservoir from the tank. The fuel pumps have their intakes connected to filters. Fuel from the outlets of the fuel pumps is delivered past non-return check valves to a manifold. The manifold is connected with a pressure regulator valve which is fluidly communicative with the engine of the vehicle. A relief outlet is also provided to deliver excess fuel back to the reservoir.

DETAILED DESCRIPTION OF THE INVENTION

Figure 1:
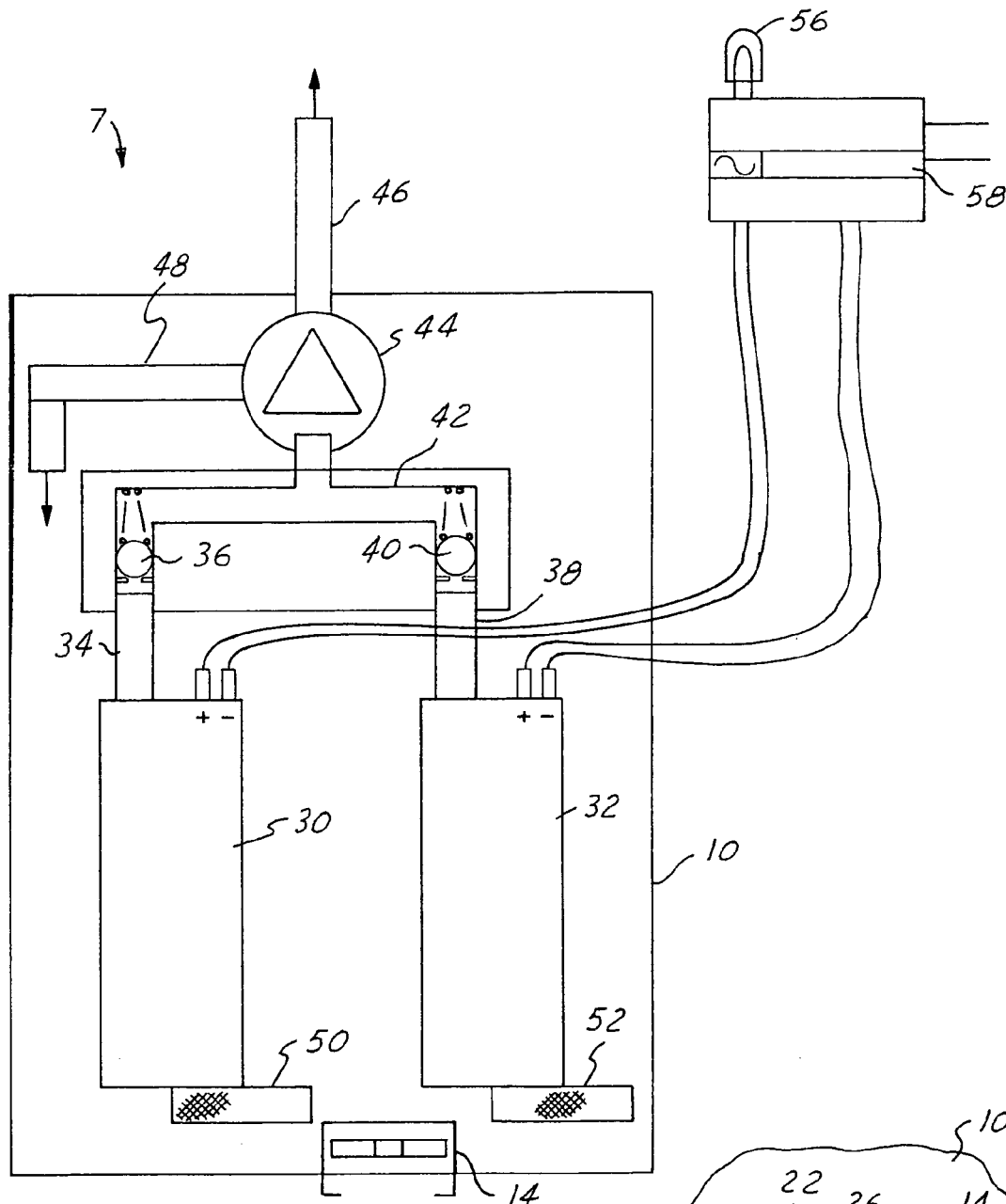
FIG. 1 is a schematic view of a fuel delivery system according to the present invention.
Figure 2:
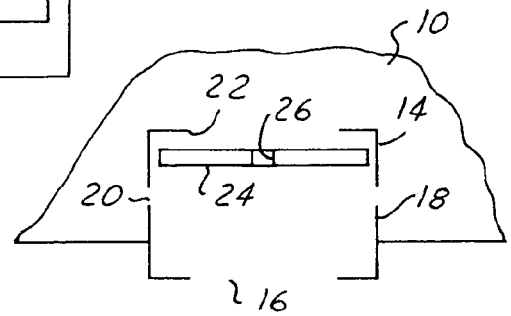
FIG. 2 is an enlarged view of a portion of the fuel delivery system shown in FIG. 1.

Referring to FIGS. 1 and 2, a multiple pump fuel delivery system 7 is provided. The fuel delivery system 7 includes a pump module or reservoir 10. The reservoir 10 is positioned within a fuel tank of a vehicle. At the bottom of the reservoir 10 is a differential pressure valve provided by a low pressure check valve 14. The low pressure check valve 14 has a lower opening 16. The low pressure check valve 14 has a generally cylindrical body 18. The cylindrical body 18 has a series of radially extending apertures 20 and an upper opening 22.

Slidably fitted within the cylindrical body 18 is an orifice plate 24. When the pressure within the fuel tank is greater than the pressure within the reservoir 10, the orifice plate 24 will be moved upward. The orifice plate 24 may have a metered opening 26. When the orifice plate 24 moves upward, fuel from the tank communicates into the reservoir 10 through the apertures 20 and through the opening 26. In both instances a pressure drop will occur.

When the pressure within the tank is lower than that in reservoir 10, the orifice plate 24 will move down to become, in essence, a stopper over the opening 16. Typically, the orifice plate 24 will only cover the opening 16 in situations where the vehicle is accelerated or in a hard turn wherein fuel within the tank is displaced away from the low pressure check valve 14.

The fuel delivery system 7 has a first pump 30 connected within the reservoir 10. Additionally, the fuel delivery system 7 has at least a second pump 32 connected within the reservoir 10. The first and second pumps 30, 32 are electrically powered. An outlet 34 of the first pump 30 is fluidly communicative with a check valve 36. An outlet 38 of a second pump 32 is fluidly connected with a check valve 40. Fuel which passes the check valves 36, 40 is joined to a common header or manifold 42. Fuel passing from the manifold 42 is admitted to a pressure regulator valve 44.

The valve 44 has a pressure regulated outlet 46 which fluidly communicates with the engine of the vehicle. The valve 44 also has a relief outlet 48. The relief outlet 48 communicates excess fuel to the interior of the reservoir 10. During turns, acceleration, etc., the fuel in the tank outside of the reservoir 10 can be pulled away from the low pressure check valve 14. Fuel retained within the reservoir 10 allows the fuel pumps 30, 32 to run without interruption for brief transients. When sufficient fuel returns to an area adjacent to the low pressure check valve 14, fuel from the tank will again enter into the reservoir 10.

The first pump 30 has an inlet operatively associated with a first filter 50. In a similar manner, the inlet of the second pump 32 is operatively associated with a second filter 52. If one of the pumps 30, 32 should fail, there is sufficient output from the other fuel pump to run the engine in most conditions except heavy (wide open) throttle.

An alarm or indicator light 56 is provided to alert an operator of a pump failure. Methods to activate the indicator light include a current sensing relay 58 which is activated when the current drops below a predetermined value. Other methods include a logical comparison of fuel pressure versus throttle angle or by just a comparison of fuel output pressure alone.

In typical current sensing applications, the predetermined current value can be 1.5 amps. In normal operation, pump current would typically be 4 to 6 amps. If a pump jams due to contamination, the current will escalate to 20 amps and thereafter blow a fuse wherein current will equal 0 amps. If the brushes for the pump motor wear, the pump will go to open circuit wherein the current will be 0 amps. If a filter should get plugged, there will be no fuel in the interior chamber of the pump; accordingly, there will be no pressure and current will be less than 1 amp.

Figure 3:
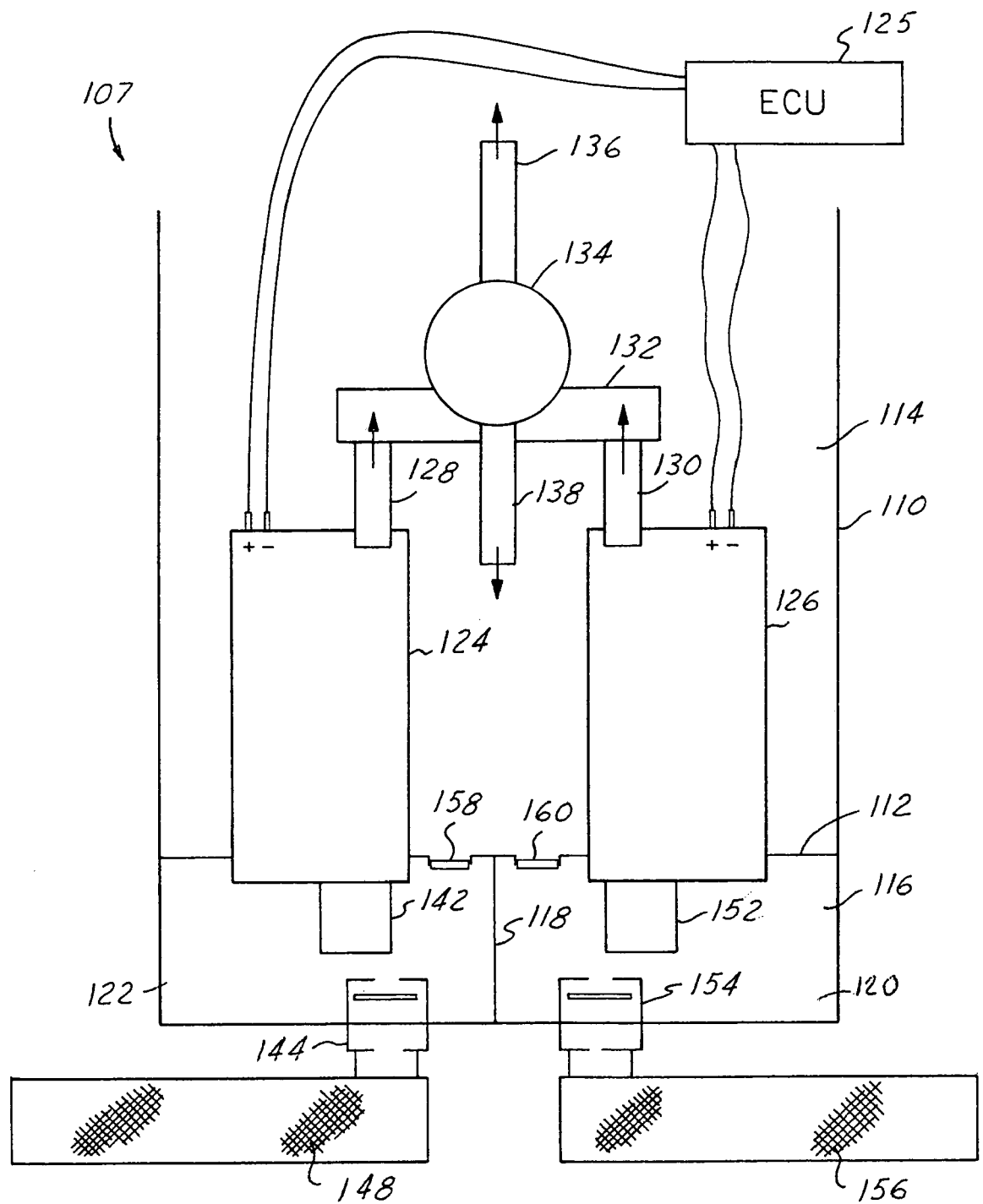
FIG. 3 is a view similar to that of FIG. 1 of an alternative preferred embodiment fuel delivery system according to the present invention.
Figure 4:
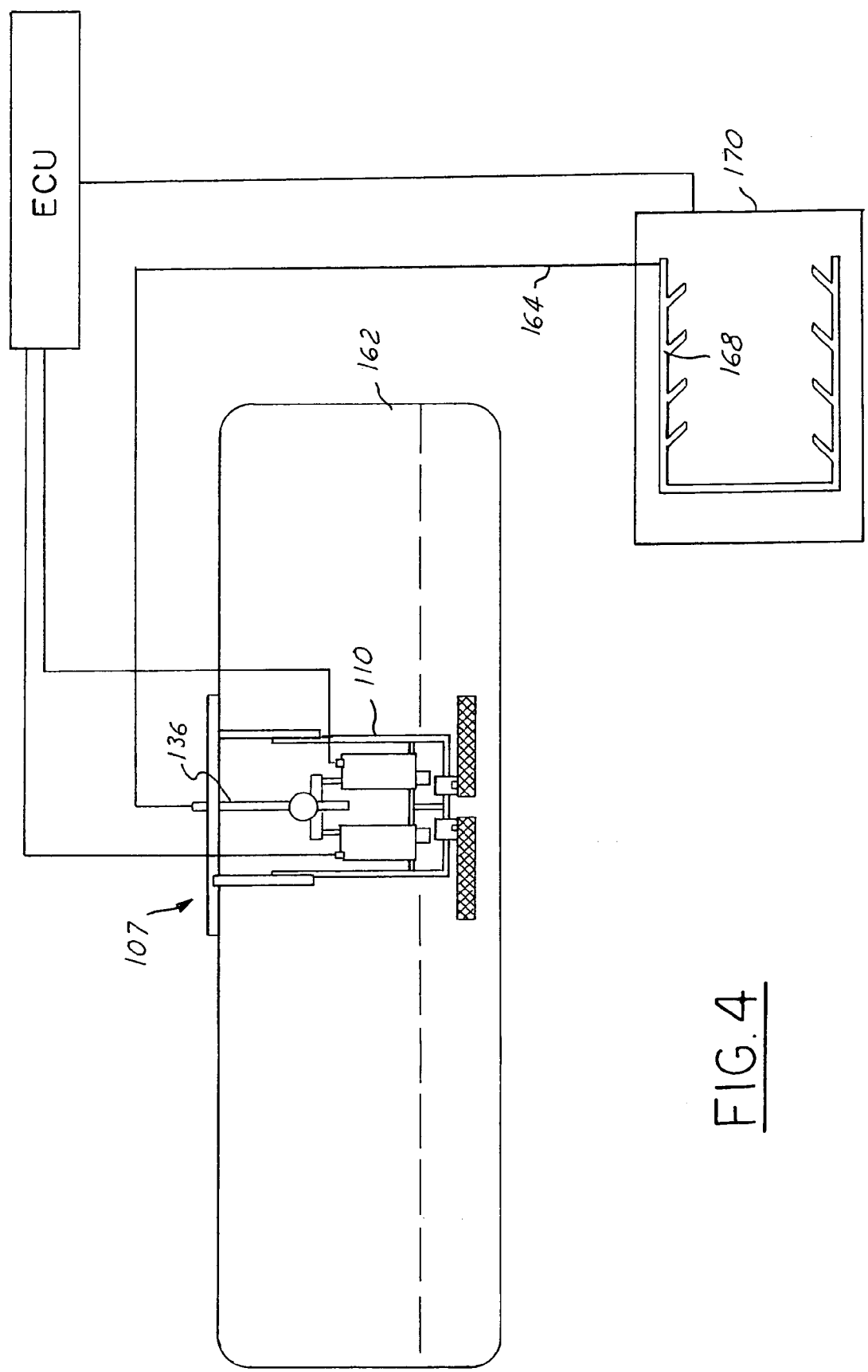
FIG. 4 is a schematic view of the fuel delivery system shown in FIG. 3 placed within a fuel tank of a marine vehicle.

Turning now to FIGS. 3 and 4, a fuel delivery system 107 is provided. The fuel delivery system 107 has a reservoir 110 which is positioned in a tank 162. The reservoir 110 has a separator 112 which divides the reservoir 110 into an upper chamber 114 and a lower chamber 116. The lower chamber 116 is further subdivided by a diametric separator wall 118 into subchambers 120, 122.

A first pump 124 is provided which serves as a primary fuel system pump. At least one second pump 126 is provided which serves as a secondary pump. The outlets 128, 130 of the pumps are similar in the aforedescribed outlets 34, 38 and both outlets 128, 130 will typically have check valves to prevent backflow toward the pumps 124 or 126.

Additionally, a manifold 132 is provided which connects with a pressure regulator valve 134. The pressure regulator valve has an engine fuel outlet 136 and a relief outlet 138. The pumps 124, 126 may be connected within the reservoir 110 by connection with the manifold 132 or by support by the divider wall 118.

The first pump 124 has an inlet 142 which is exposed to the subchamber 122. The subchamber 122 also may have a low pressure valve or a differential pressure valve 144. The valve 144 has its intake connected with a first lower filter medium 148. In a similar fashion, the second pump 126 has an inlet 152 which is exposed to the subchamber 120. Fuel is admitted into the subchamber 120 via a differential pressure valve 154 which has its inlet connected with a second filter medium 156. Typically, the first pump 124, will have a filter medium 148 that separates water from the fuel, thereby only allowing the passage of fuel therethrough.

An electronic control unit 125 will control the pump 124 to be normally operational during all idle conditions, including idle, partial throttle, wide open throttle, at the start of operation and on a limp home condition when only one pump is operational. The second pump 126 will be utilized only in the wide open throttle (high fuel demand) conditions or when the first pump 124 is nonoperational.

An alternative control scheme by the electronic control unit 125 is to decide to operate the first pump 124 during normal conditions and then to operate the second pump 126 based upon engine speed or load conditions. Electronic control unit 125 can also make its decision to operate the second pump 126 based upon water ingestion criteria.

In still another alternative control scheme, the electronic control unit 125 can alternately switch between the first pump 124 and the second pump 126 for different engine startups or upon run time intervals of the pumps to reduce total pump running time on either pump and to also avoid malfunction of a pump due to extended nonuse. In this scenario, the electronic control unit can switch the control scheme based upon the operational criteria aforementioned and alternately determine whether or not the pump 124 will be treated as a primary or secondary pump.

The filter medium 148 will allow only the passage of fuel. The second filter medium 156 will allow passage of fuel and the passage of fuel and water mixtures. The filter mediums 148, 156 will be mesh type filters with a pore size of 30 to 100 microns.

The first filter medium 148 can use acetal or nylon with alternating material such as Saran® and polyester. Alternatively, coating acetal or nylon filter with a water shedding material such as Teflon® can be used to fabricate the first filter medium. Such filters only allow fuel to pass and sheds the water back into the fuel in the main tank. The second filter medium 156 can typically have acetal or nylon as a weave medium and have a typical Dutch weave or a double Dutch weave. As an alternative the filter mediums 148, 156 can both be fabricated from a paper construction and the first filter medium 148 can be coated to provide the water separation function.

The separator 112 has placed therein an upper first filter medium 158 and an upper second filter medium 160. Excess fuel delivered to the upper chamber 114 will be allowed to pass into subchamber 122 via the filter medium 158 and into subchamber 120 through the filter medium 160.

The upper first filter medium 158 will allow only the passage of fuel. The second upper filter medium 160 will allow the passage of fuel and water mixtures. Accordingly, subchamber 122 will be filled with fuel only and subchamber 120 will be filled with a combination of fuel and water mixtures. Again, during periods of turning or acceleration, fuel in the tank is pushed away from the filter mediums 148, 156. Fuel within the reservoir 110 will be utilized during these transient conditions.

The reservoir 110 can be attached to a fuel tank in a manner described in commonly assigned U.S. Patent Application "Tank Assembly", Zdroik et al. filed Jun. 4, 2003, or in another suitable manner. The outlet 136 will be connected by a fuel line 164 with a fuel rail 168 which delivers fuel to an engine represented schematically as item 170.

Figure 5:
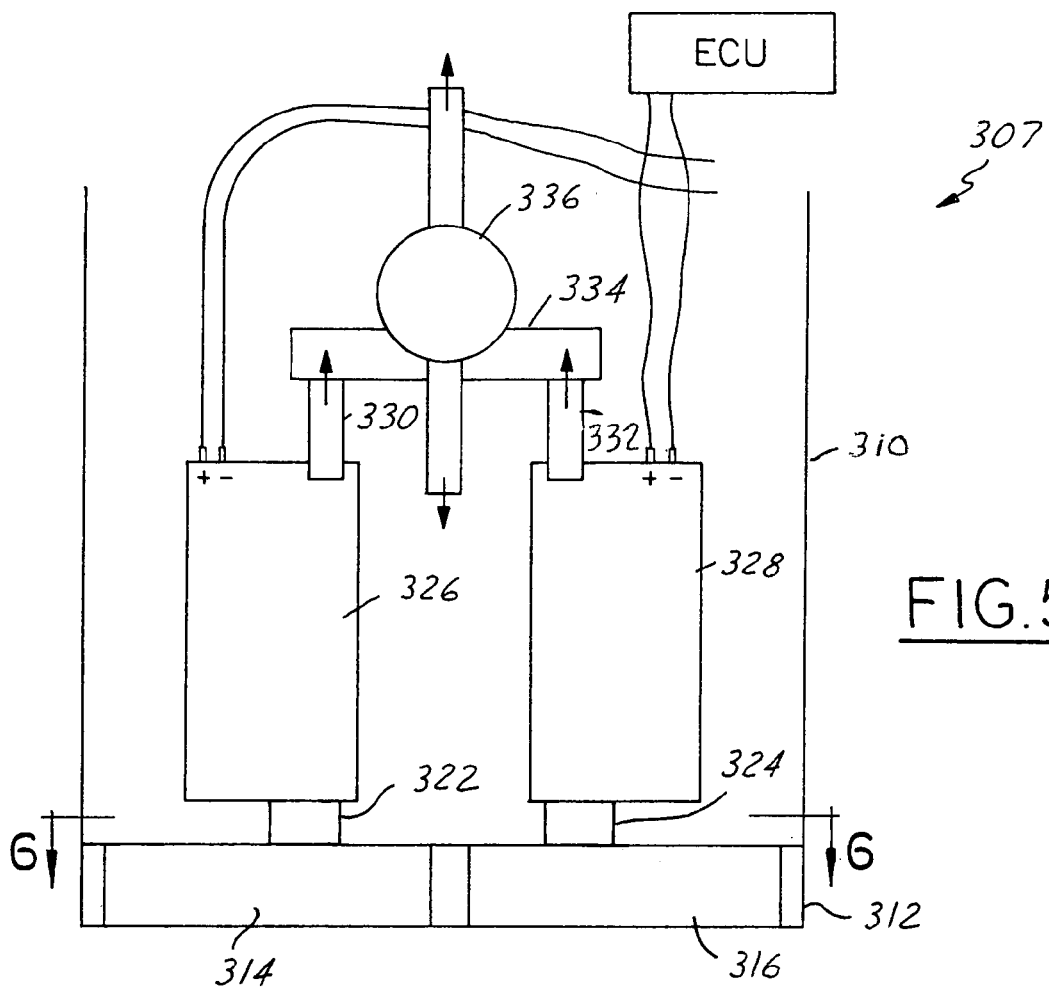
FIG. 5 is a schematic view similar to that of FIG. 1 of another alternative preferred embodiment fuel delivery system of the present invention.
Figure 6:
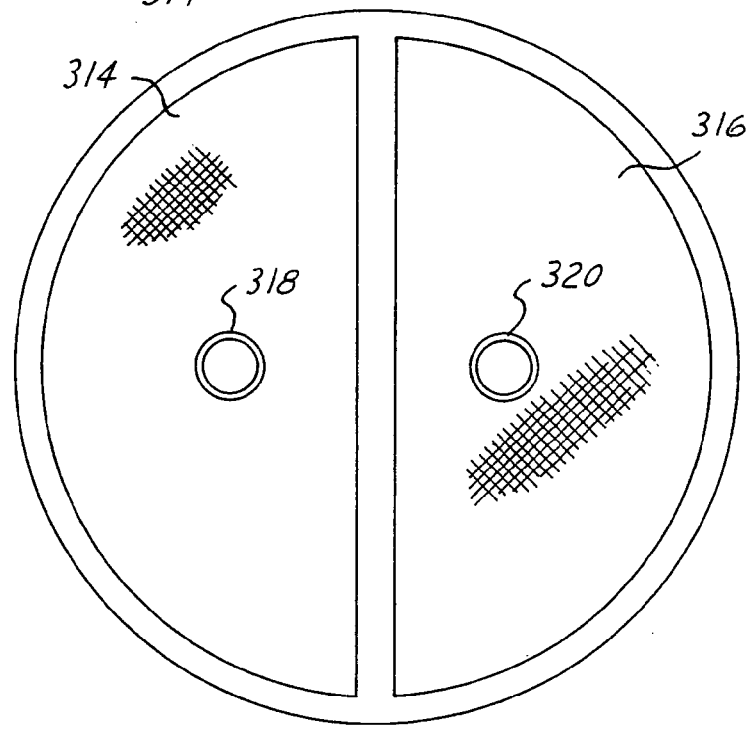
FIG. 6 is a view taken along line 6—6 of FIG. 5.

Referring to FIGS. 5 and 6, a fuel delivery system 307 is provided. The fuel delivery system 307 has a reservoir 310. A bottom pressure boundary of the reservoir 310 is provided by a filter case 312. The filter case 312 has a compound filter medium provided by a first filter medium 314 and a second filter medium 316. Filter mediums 314, 316 have upper and lower surfaces and have respective posts 318, 320 which are inserted into respective pump inlets 322, 324 of the first pump 326 and the second pump 328. Either filter mediums 314, 316 may allow the passage of only fuel or may allow the passage of fuel and water mixtures.

During normal operation the pumps 326, 328 draw fuel or a fuel water mixture through their respective filters. The pumps 326, 328 have check valve supplied outlets 330, 332 which feed into a pressure regulator valve 336 via a manifold 334. Due to acceleration or tilt of the vehicle when fuel is removed from a bottom surface of the filter mediums 314, 316, fuel in the interior of the reservoir 310 will seep through the upper surfaces of mediums 314, 316 and be sucked into their respective pumps 326, 328 during the transient operation.

The surface tension of the fuel on the lower surfaces of the filter mediums 314, 316 delays any draining of the fuel through the filters 314, 316 back into the tank until the fuel returns to contact with the underside of the filters. Accordingly, the filters 314, 316 by delaying return of the fuel from outside of the reservoir back into the tank, allow for uninterrupted pump operation during transient maneuvers which often occur during a turning operation of the vehicle wherein the fluid is accelerated away from the reservoir 310.

Figure 7:
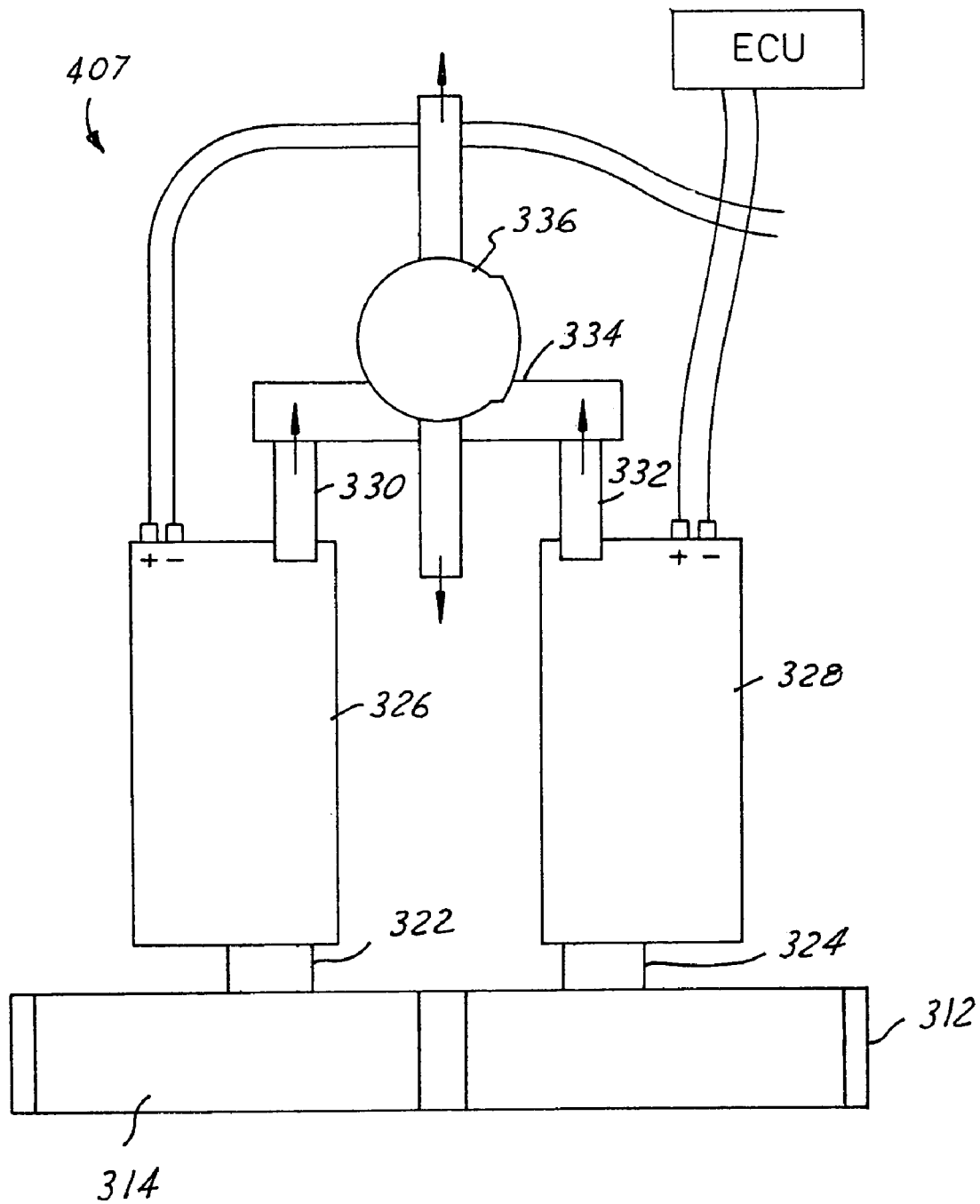
FIG. 7 is a schematic view of an alternate preferred embodiment similar to that shown in FIG. 5.

Referring to FIG. 7 a fuel delivery system 407 is provided which is similar to prior described fuel delivery system 307. Fuel delivery system 407 has the pumps 326, 328 placed directly within the tank. Fuel delivery system 407 may employ one of the aforedescribed control schemes for the pumps. In many instances, fuel delivery system 407 will present a lower cost than the fuel delivery system 307.

Various embodiments of the present invention have been shown. It will be apparent to those skilled in the art of the various modifications which can be made to the present invention without departing from the spirit or scope of the invention as it is encompassed by the following claims.

The invention claimed is:

1. A multiple fuel pump delivery system for a vehicle with an internal combustion engine, comprising:
   a fuel tank;
   a fuel reservoir fluidly communicative with said fuel tank via a differential pressure valve;
   a first electrically powered fuel pump connected within said reservoir;
   at least a second electrically powered fuel pump connected within said reservoir;
   a first check valve fluidly communicative with an outlet of said first fuel pump;
   a second check valve fluidly communicative with an outlet of said second fuel pump;
   a pressure regulator valve fluidly communicative with said first and second check valves, said pressure regulator valve having a first pressure regulated outlet fluidly communicative with said internal combustion engine and a second relief outlet, fluidly communicative with said reservoir.

2. A fuel delivery system as described in claim 1, wherein a sensor is provided to determine a pump failure in one of said pumps.

3. A fuel delivery system as described in claim 2, wherein said sensor senses current to at least one of said pumps.

4. A fuel delivery system as described in claim 2 wherein said sensor activates an alarm to alert a vehicle operator of a pump failure.

5. A fuel delivery system as described in claim 2, wherein said sensor senses fuel pressure of at least one of said pumps.

6. A fuel delivery system as described in claim 2, wherein said first pump is normally always operational and wherein said second pump operates under higher levels of fuel demand or when said first pump is non-operational.

7. A fuel delivery system as described in claim 1, wherein an electronic control unit connected to said pumps decides when to utilize said first pump and/or said second pump based upon engine and speed load conditions.

8. A fuel delivery system as described in claim 1, wherein an electronic control unit connected to said pumps decides to turn on said first pump and/or said second pump based upon water ingestion criteria.

9. A fuel delivery system as described in claim 1, wherein an electronic control unit switches between said first pump and said second pump based upon alternating engine startups or upon run time intervals to reduce the total running time on either said first pump or second pump and to avoid malfunction of said pumps due to extended nonuse.

10. A fuel delivery system as described in claim 1, wherein each of said pumps has a fuel filter associated therewith and wherein said first pump has a water separating filter and wherein said second pump has a water passing filter.

11. A fuel delivery system as described in claim 1, wherein said fuel pumps have a filter associated therewith and wherein said filters are positioned within said reservoir.

12. A multiple pump fuel delivery system for a vehicle with an internal combustion engine comprising:
   a fuel tank;
   a first electrically powered fuel pump fluidly communicative with said fuel tank;
   at least a second electrically powered fuel pump fluidly communicative with said fuel tank;
   a pressure regulator valve fluidly communicative with said first and second fuel pumps for delivering pressure regulated fuel to said engine, said pressure regulator valve having a relief outlet for returning excess fuel to said fuel tank;
   a water separating filter fluidly communicative with said tank and with an inlet of said first pump; and
   a water passing filter, fluidly communicative with said tank and with an inlet of said second pump.

13. A fuel delivery system as described in claim 12, wherein said filters are of a paper construction and wherein said water separating filter is coated to provide water separation.

14. A fuel delivery system as described in claim 12, further including an electronic control unit wherein said second pump is on only when said internal combustion engine has a high fuel demand or wherein there is a failure in said first pump.

15. A fuel delivery system as described in claim 12, wherein said filters are mesh-type filters with a pore size between 30 and 100 microns.

16. A fuel delivery system as described in claim 12, further including a sensor to determine a pump failure in one of said pumps.

17. A fuel delivery system as described in claim 16, wherein said sensor senses current to at least one of said pumps.

18. A fuel delivery system as described in claim 16, wherein said sensor activates an alarm to alert a vehicle operator of a pump failure.

19. A fuel delivery system as described in claim 16, wherein said sensor senses fuel pressure of at least one of said pumps.

20. A fuel delivery system as described in claim 16, wherein said first pump is normally always operational and wherein said second pump operates under higher levels of fuel demand or when said first pump is non-operational.

21. A fuel delivery system as described in claim 16, wherein an electronic control unit connected to said pumps decides when to utilize said first pump and/or said second pump based upon engine and speed load conditions.

22. A fuel delivery system as described in claim 16, wherein an electronic control unit connected to said pumps decides to turn on said first pump and/or said second pump based upon water ingestion criteria.

23. A fuel delivery system as described in claim 16, wherein an electronic control unit switches between said first pump and said second pump based upon alternating engine startups or upon run time intervals to reduce the total running time on either said first or second pump and to avoid malfunction of said pumps due to extended nonuse.

24. A multiple pump fuel delivery system for a vehicle with an internal combustion engine comprising:
   a fuel tank;
   a fuel reservoir fluidly communicative with said fuel tank;
   a first electronically powered fuel pump connected with said reservoir;
   at least a second electrically powered fuel pump connected with said reservoir;
   a pressure regulator valve fluidly communicative with said first and second fuel pumps for delivering pressure regulated fuel to said engine, said pressure regulator valve having a relief outlet for returning excess fuel to said reservoir;

a first water separating filter medium fluidly communicative with said tank and with an inlet of said first pump; and a second water passing filter medium, fluidly communicative with said tank and with an inlet of said second pump.

25. A fuel delivery system as described in claim 24, further including a separator wall and wherein said separator wall has a water passing filter and a water separating filter and wherein an area under said separator wall has a divider between intakes of said first and second pumps.

26. A fuel delivery system as described in claim 24, wherein said filters are of a paper construction and wherein said water separating filter is coated to provide water separation.

27. A fuel delivery system as described in claim 24, wherein at least one of said pumps has a differential pressure valve between an intake of said pump and said filter.

28. A fuel delivery system as described in claim 24, further including an electronic control unit wherein said second pump is on only when said internal combustion engine has a high fuel demand or wherein there is a failure in said first pump.

29. A fuel delivery system as described in claim 24, wherein said filters are mesh-type filters with a pore size between 30 and 100 microns.

30. A multiple pump fuel delivery system for a vehicle with an internal combustion engine comprising:

a fuel reservoir;

a first electrically powered fuel pump;

at least a second electrically powered fuel pump;

a first water separating filter medium having a lower surface exposed to the fuel tank and an upper surface having a portion fluidly communicative with an inlet of said first pump, said first filter medium forming a pressure boundary for said reservoir;

a second water passing filter medium having a lower boundary forming a pressure boundary for said reservoir and being fluidly communicative with said second pump;

a pressure regulator valve with a pressure regulated outlet fluidly communicative with said internal combustion engine and a relief outlet fluidly communicative with said reservoir above said first and second filter mediums.

31. A fuel delivery system as described in claim 30, wherein at least one of said filter mediums temporarily retains fuel within said reservoir for uninterrupted pumping operation during transient maneuvers of said vehicle.

* * * * *